3,297,753
SEPARATION OF ALKYL UREAS
Thomas F. Rutledge, Wilmington, Del., assignor to Atlas Chemical Industries, Inc., Wilmington, Del., a corporation of Delaware
No Drawing. Filed June 30, 1965, Ser. No. 468,624
10 Claims. (Cl. 260—553)

This invention relates to a process for separately recovering N-t-alkyl urea and N,N'-di-t-alkyl urea from their mixture and to a process for separately recovering N-t-alkyl urea and N,N'-di-t-alkyl urea from the reaction mixture resulting from the alkylation reaction between tertiary olefin and urea in the presence of sulfuric acid.

It is an object of the present invention to provide an improved process for separately recovering N-t-alkyl urea and N,N'-di-t-alkyl urea from their mixtures.

It is also an object of the present invention to provide an improved process for separately recovering N-t-alkyl urea and N,N'-di-t-alkyl urea from the reaction mixture resulting from the alkylation reaction between tertiary olefin and urea in the presence of sulfuric acid.

Other objects and advantages of this invention will further become apparent in the following description and in the appended claims.

In accordance with the present invention, N-t-alkyl urea and N,N''-di-t-alkyl urea are separately recovered from their mixture by extracting the mixture with an aqueous solution of a water-miscible organic liquid selected from the group consisting of monohydric alcohols, ketones, dioxanes, and mixtures thereof, separating the insoluble N,N'-di-t-alkyl urea, and recovering the dissolved N-t-alkyl urea from its solution in the said aqueous solution of water-miscible organic liquid.

The water-miscible organic liquid is selected from the group consisting of monohydric alcohols, ketones, dioxane, and mixtures thereof. Typical examples of monohydric alcohols and ketones include methanol, ethanol, propanol, isopropanol, tertiary butanol, acetone, methyl ethyl ketone, diethyl ketone, and the like.

The mixture of N-t-alkyl urea and N,N'-di-t-alkyl urea is extrated with the aqueous solution of a water-miscible organic liquid by contacting the mixture of N-t-alkyl urea and N,N'-di-t-alkyl urea with a hot aqueous solution of the water-miscible organic liquid. The water and water-miscible organic liquid can be added separately or mixed together prior to addition to the alkyl urea mixture.

The temperature during extraction, the concentration of the aqueous solution of water-miscible organic liquid, and the amount used can vary widely. However, best results are obtained by maintaining the temperature between about 50–100° C., preferably between about 70–80° C., using an aqueous solution containing from about 5 to about 40 volume percent of the water-miscible organic liquid, and using from about 3 ml. to about 12 ml. of the aqueous solution per gram of solid.

Extraction with the hot aqueous solution dissolves the N-t-alkyl urea and the insoluble N,N'-di-t-alkyl urea is removed by any suitable means, such as by filtration. Upon cooling the filtrate, N-t-alkyl urea precipitates and is removed by any suitable means, such as by filtration.

In the following examples, a mixture of 10 grams of N-t-butyl urea and 10 grams of N,N'-di-t-butyl urea were mixed with the indicated amount of extractant and heated to the indicated temperature. The insoluble N,N'-di-t-butyl urea was removed by filtering while hot, dried, and weighed. The filtrate was concentrated by evaporation, cooled, and the precipitated N-t-butyl urea recovered by filtering. The recovered N-t-butyl urea was also dried and weighed. It will be understood, of course, that the following examples are merely for exemplification purposes and are not to be construed as limiting the scope of the appended claims.

SEPARATION OF MIXTURE OF N-t-BUTYL UREA AND N,N'-DI-t-BUTYL UREA

| Ex. No. | Extractant | Ml./g. solid | T° C | Grams Di. Recovered | Grams Mono Recovered |
|---|---|---|---|---|---|
| 1 | 15.8 Volume Percent Ethyl Alcohol. | 6 | 90 | 10.1 | 8.5 |
| 2 | ----do---- | 3.5 | 90 | 11.5 | 6.4 |
| 3 | ----do---- | 5 | 90 | 10.3 | 8.0 |
| 4 | 20 Volume Percent Ethyl Alcohol. | 5 | 90 | 10.3 | 8.2 |
| 5 | 16.6 Volume Percent Acetone. | 6 | 70 | 10.1 | 8.3 |
| 6 | 15 Volume Percent Acetone. | 5 | 68 | 11.5 | 7.1 |
| 7 | 20 Volume Percent Acetone. | 5 | 76 | 10.5 | 7.8 |
| 8 | 16.6 Volume Percent Isopropyl Alcohol. | 6 | 94 | 10.1 | 8.3 |
| 9 | 15 Volume Percent Isopropyl Alcohol. | 5 | 92 | 10.2 | 7.7 |
| 10 | 20 Volume Percent Isopropyl Alcohol. | 5 | 92 | 10.0 | 7.7 |
| 11 | 25 Volume Percent Isopropyl Alcohol. | 5 | 90 | 9.8 | 8.5 |
| 12 | 16.6 Volume Percent Methanol. | 6 | 72 | 10.6 | 8.0 |
| 13 | 20 Volume Percent Methanol. | 6.2 | 74 | 9.8 | 8.3 |
| 14 | ----do---- | 5 | 74 | 10.4 | 7.8 |
| 15 | 25 Volume Percent Methanol. | 5 | 75 | 10.2 | 7.2 |

The process of the present invention can also be used to separately recover N-t-alkyl urea and N,N'-di-t-alkyl urea from the reaction mixtures resulting from the alkylation reaction between tertiary olefin and urea in the presence of sulfuric acid. The method of preparing N-t-alkyl urea and N,N'-di-t-alkyl urea by alkylating urea with a tertiary olefin in the presence of sulfuric acid is well known in the art as shown by United States Patents 2,548,585; 2,849,485; and 2,849,488. The reaction mixture contains N-t-alkyl urea, N,N'-di-t-alkyl urea, sulfuric acid, urea-sulfate, unreacted tertiary olefin, oligomers of tertiary olefin, water, and any organic diluent that may have been employed.

In accordance with the present invention, N-t-alkyl urea and N,N'-di-t-alkyl urea can be separately recovered from the reaction mixture by diluting the reaction mixture with water, separating the aqueous layer from any water-insoluble liquid layer, neutralizing the aqueous layer with an inorganic base which forms water-soluble sulfates, separating the precipitated mixture of N-t-alkyl urea and N,N'-di-t-alkyl urea from the aqueous neutralized solution, extracting the precipitated mixture with an aqueous solution of a water-miscible liquid selected from the group consisting of monohydric alcohols, ketones, dioxane, and mixtures thereof, separating the insoluble N,N'-di-t-alkyl urea, and recovering the dissolved N-t-alkyl urea from its solution in the said aqueous solution of water-miscible organic liquid.

The amount of water added depends on the acid concentration of the reaction mixture and on the amount of organic diluent used. Sufficient water should be added to insure good phase separation, but N,N'-di-t-alkyl urea will precipitate if the acid concentration in the aqueous phase falls below about 50 weight percent. Thus, the amount of water added should not be more than about 100 ml. of water per mol of sulfuric acid charged.

Upon addition of the water, the reaction mixture rapidly separates into separate phases at room temperature. The organic layer comprises unreacted tertiary olefin, oligomers of tertiary olefin, and any insoluble organic diluent that may have been used. The aqueous layer comprises water, sulfuric acid, urea-sulfate, N-t-alkyl urea, and N,N'-di-t-alkyl urea. The layers can be separated by decantation.

The aqueous layer is neutralized with an inorganic base which forms water-soluble sulfates, such as ammonia, sodium hydroxide, and sodium carbonate, in amount at least stoichiometrically equivalent to the sulfuric acid and preferably until the pH is at least 9. Vigorous agitation is desirable to minimize particle size of the N-t-alkyl urea and N,N'-di-t-alkyl urea which precipitates as the aqueous layer is neutralized.

The neutralized mixture is cooled and filtered to remove the precipitated N-t-alkyl urea and N,N'-di-t-alkyl urea. The precipitated mixture of N-t-alkyl urea and N,N'-di-t-alkyl urea is extracted with a hot aqueous solution of a water-miscible organic liquid selected from the group consisting of monohydric alcohols, ketones, dioxane and mixtures thereof, as described above.

With the foregoing general discussion in mind, there is given herewith detailed examples of the separation of N-t-butyl urea and N,N'-di-t-butyl urea from the reaction mixture resulting from the alkylation reaction between isobutylene and urea in the presence of sulfuric acid. The following detailed examples are illustrative of the process of this invention but are not intended as a limitation upon its scope.

*Example 16*

30 grams of urea is placed in a 500 ml. creased Morton flask. The flask is equipped with a gas inlet tube, a dropping funnel, and a reflux condenser. The stirring device is a Labline Cruciform impeller turned by a Dumore high speed motor via a flexible shaft. Cyclohexane, 200 ml., is added and the stirred mixture is cooled to 10° C. One mol of 96% sulfuric acid is added to the stirred urea-cyclohexane slurry over a period of 15 minutes at 10–20° C. The slurry is stirred for 45 minutes, during which time the temperature increases to about 30° C. The mixture is cooled to 5–10° C. and isobutylene is added at a rate of 9 liters per hour for three hours while stirring at around 8,000 r.p.m. At the end of three hours, the isobutylene flow is stopped and the stirring continued for 15 minutes. The reaction mixture contains N-t-butyl urea, N,N'-di-t-butyl urea, sulfuric acid, urea-sulfate, unreacted isobutylene, oligomers of isobutylene, water, and cyclohexane. 50 ml. of water is added to the reaction mixture and the aqueous layer is separated from the cyclohexane layer by decanting the upper cyclohexane layer. Ammonium hydroxide is added to the aqueous layer until the pH is about 9 thus causing the N-t-butyl urea and N,N'-di-t-butyl urea to precipitate. The precipitated mixture of N-t-butyl urea and N,N'-di-t-butyl urea is removed by filtering the aqueous slurry and extracting with a boiling mixture of 85 ml. of ethanol and 400 ml. of water. The insoluble portion, N,N'-di-t-butyl urea, is removed by filtering and weighed 10.7 grams. The filtrate is concentrated by evaporation and cooled to precipitate the N-t-butyl urea. The N-t-butyl urea is removed by filtering and weighs 38.3 grams.

*Example 17*

A mixture of N-t-butyl urea and N,N'-di-t-butyl urea is prepared by reacting 306 grams urea, 932 grams of 92.0% sulfuric acid, and 560 grams of isobutylene in 2100 ml. of cyclohexane. Upon completion of the reaction, the reaction mixture is diluted with 573 grams of water while maintaining the temperature between 25–30° C. The reaction mixture separates into two layers and the upper cyclohexane layer is discarded. The lower aqueous layer is neutralized with 29% ammonia while stirring vigorously and maintaining the temperature between 20–35° C. by external cooling with a water bath. The aqueous layer is neutralized to a pH of about 9 and is then cooled to 20° C. whereby N-t-butyl urea and N,N'-di-t-butyl urea precipitate. The slurry is filtered and the filtrate discarded. The filter cake is washed with 0.6 liter of cold (5° C.) water and this wash liquor discarded. The filter cake is then transferred to a 12 liter flask and 595 ml. of 3A denatured ethyl alcohol is added and the mixture heated to 70° C. with stirring under reflux in a hot water bath and 4420 grams of water are added slowly while maintaining the temperature at about 70° C. During the addition of water, the pH is checked and 29% ammonia is added if necessary to give a pH of 9. After addition of the water, the charge is heated to 77° C. and held at 77° C. with stirring for 15 minutes. The hot magna is filtered to recover the N,N'-di-t-butyl urea and the filter cake washed with a hot mixture of 43 ml. of 3A denatured alcohol and 357 ml. of water. The filtrate and aqueous alcohol wash liquor are used for recovery of N-t-butyl urea. The filtrate and alcohol wash liquor from the N,N'-di-t-butyl urea are cooled, with stirring, to 10° C., filtered and washed with 1.2 liters of cold (5° C.) water to obtain N-t-butyl urea. A second crop of N-t-butyl urea is obtained by concentrating the filtrate, cooling to 10° C. to precipitate the N-t-butyl urea, and filtering. The second crop of N-t-butyl urea is about 10–25% as large as the first crop. The amount of N-t-butyl urea and N,N'-di-t-butyl urea recovered was 79.4 and 2.4, respectively, percent of theory based on the urea charged.

*Example 18*

A mixture of N-t-hexyl urea and N,N'-di-t-hexyl urea is prepared by reacting 120 grams of urea, 422 grams of 93% sulfuric acid, and 269 grams of 2-methyl pentene-1 in 840 ml. of dichloromethane. Upon completion of the reaction, the reaction mixture is diluted with 85 ml. of water. The aqueous phase is separated and neutralized with ammonium hydroxide until the pH is about 10, thus causing the N-t-hexyl urea and N,N'-di-t-hexyl urea to precipitate. The aqueous slurry is filtered and the filter cake extracted with a boiling mixture of 150 ml. of ethanol and 2850 ml. of water. The insoluble portion, N,N'-di-t-hexyl urea, is removed by filtering the hot magna. The filtrate is concentrated by evaporation and cooled to precipitate the N-t-hexyl urea which is removed by filtering.

Although the process of the present invention has been described with reference to the separation of particular N-t-alkyl ureas and N,N'-di-t-alkyl ureas, it is apparent that the process is capable of considerable variation. Thus, the process of the present invention may be used to separate other N-t-alkyl ureas and N,N'-di-t-alkyl ureas. The N-t-alkyl ureas and N,N-di-t-alkyl ureas usually employed are those containing from 4–8 carbon atoms in the tertiary alkyl group, that is, tertiary alkyl ureas corresponding to the formulae

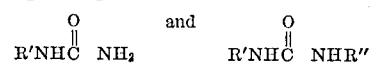

where R' and R" are tertiary alkyl groups containing from 4 to 8 carbon atoms, such as N-t-butyl urea, N-t-amyl urea, N-t-hexyl urea, N-t-octyl urea, N,N'-di-t-butyl urea, N,N'-di-t-amyl urea, N,N'-di-t-hexyl urea, and N,N'-di-t-octyl urea.

Having thus described the invention, what is claimed is:

1. A process for separating and recovering N-t-alkyl urea and N,N'-di-t-alkyl urea from their mixture in solid form which comprises extracting the mixture with an aqueous solution of a water-miscible organic liquid selected from the group consisting of monohydric alcohols, ketones, dioxane, and mixtures thereof, removing the insoluble N,N'-di-t-alkyl urea, and recovering the dissolved N-t-alkyl urea from its solution in the said aqueous solution of water-miscible organic liquid.

2. A process for separating and recovering N-t-alkyl urea and N,N'-di-t-alkyl urea, containing from 4–8 carbon atoms in the tertiary alkyl groups, from their mixture in solid form which comprises extracting the mixture with an aqueous solution of a water-miscible organic liquid selected from the group consisting of monohydric alcohols, ketones, dioxanes, and mixtures thereof, removing the insoluble N,N'-di-t-alkyl urea, and recovering the dissolved N-t-alkyl urea from its solution in the said aqueous solution of water-miscible organic liquid.

3. The process of claim 2 wherein the aqueous solution of a water-miscible organic liquid is an aqueous solution of ethanol containing from about 5 to about 40 volume percent of ethanol.

4. The process of claim 2 wherein the N-t-alkyl urea is N-t-butyl urea and the N,N'-di-t-alkyl urea is N,N'-di-t-butyl urea.

5. A process for separating and recovering N-t-alkyl urea and N,N'-di-t-alkyl urea from a reaction mixture resulting from the alkylation reaction between tertiary olefin and urea in the presence of sulfuric acid which comprises:
   (1) diluting the reaction mixture with water;
   (2) separating the aqueous layer from the water-insoluble liquid layer;
   (3) adding to the aqueous layer an inorganic base which forms water-soluble sulfates in amount at least stoichiometrically equivalent to the sulfuric acid;
   (4) separating the precipitated mixture of N-t-alkyl urea and N,N'-di-t-alkyl urea from the aqueous solution of inorganic sulfates;
   (5) extracting the mixture with an aqueous solution of a water-miscible organic liquid selected from the group consisting of monohydric alcohols, ketones, dioxane and mixtures thereof;
   (6) removing the insoluble N,N-di-t-alkyl urea; and
   (7) recovering the dissolved N-t-alkyl urea from its solution in the said aqueous solution of water-miscible organic liquid.

6. A process for separating and recovering N-t-alkyl urea and N,N'-di-t-alkyl urea, containing from 4–8 carbon atoms in the tertiary alkyl group, from a reaction mixture resulting from the alkylation reaction between tertiary olefin and urea in the presence of sulfuric acid which comprises:
   (1) diluting the reaction mixture with water;
   (2) separating the aqueous layer from the water-insoluble liquid layer;
   (3) adding to the aqueous layer an inorganic base which forms water-soluble sulfates in amount at least stoichiometrically equivalent to the sulfuric acid;
   (4) separating the precipitated mixture of N-t-alkyl urea and N,N'-di-t-alkyl urea from the aqueous solution of inorganic sulfates;
   (5) extracting the mixture with an aqueous solution of a water-miscible organic liquid selected from the group consisting of monohydric alcohols, ketones, dioxanes and mixtures thereof;
   (6) removing the insoluble N,N-di-t-alkyl urea; and
   (7) recovering the dissolved N-t-alkyl urea from its solution in the said aqueous solution of water-miscible organic liquid.

7. The process of claim 6 wherein the said inorganic base is selected from the group consisting of ammonia, sodium hydroxide, and sodium carbonate.

8. The process of claim 6 wherein the aqueous layer is neutralized with the said inorganic base to a pH of at least 9.

9. The process of claim 6 wherein the precipitated mixture of N-t-alkyl urea and N,N'-di-t-alkyl urea is extracted with an aqueous solution of ethanol containing from about 5 to about 40 volume percent of ethanol.

10. A process for separating and recovering N-t-butyl urea and N,N'-di-t-butyl urea from the reaction mixture resulting from the alkylation reaction between a stoichiometric excess of isobutylene and urea in the presence of sulfuric acid and an organic diluent which comprises:
   (1) diluting the reaction mixture with water in an amount not more than about 100 ml. of water per mol of sulfuric acid charged;
   (2) decanting from the diluted mixture the water-insoluble liquid layer containing unreacted tertiary olefin and oligomers thereof;
   (3) adding to the aqueous layer an inorganic base selected from the group consisting of ammonia, sodium hydroxide, and sodium carbonate until the pH is at least 9 while stirring vigorously and maintaining the temperature between about 20° C. and about 35° C.;
   (4) cooling the neutralized aqueous layer to about 20° C.; filtering, and washing the solid filter cake comprising N-t-butyl urea and N,N'-di-t-butyl urea with cold water;
   (5) adding ethyl alcohol to the solid filter cake and heating the resulting mixture to about 70° C. under reflux;
   (6) adding water while maintaining the temperature at about 70° C. and the pH of at least 9;
   (7) heating to about 77° C. for about 15 minutes and filtering while hot;
   (8) washing the filter cake of N,N'-di-t-butyl urea with a hot mixture of alcohol and water; and
   (9) separating the N-t-butyl urea from the filtrate by repeated concentrating, cooling and filtering.

References Cited by the Examiner

UNITED STATES PATENTS 2,849,485  8/1958  Massie _____ 260—553
2,849,488  8/1958  Ambelang et al. _____ 260—553

ALEX MAZEL, *Primary Examiner.*

HENRY R. JILES, *Examiner.*